US009553926B2

(12) United States Patent
Gorodyansky

(10) Patent No.: US 9,553,926 B2
(45) Date of Patent: *Jan. 24, 2017

(54) SYSTEM AND METHOD FOR PEER TO PEER SOCIAL NETWORKING

(71) Applicant: Anchorfree, Inc., Mountain View, CA (US)

(72) Inventor: David Gorodyansky, San Francisco, CA (US)

(73) Assignee: Anchorfree, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,241

(22) Filed: Aug. 4, 2014

(65) Prior Publication Data

US 2015/0149546 A1  May 28, 2015

Related U.S. Application Data

(63) Continuation of application No. 13/218,334, filed on Aug. 25, 2011, now Pat. No. 8,799,364.

(51) Int. Cl.
| | |
|---|---|
| G06F 15/16 | (2006.01) |
| H04L 29/08 | (2006.01) |
| G06Q 10/10 | (2012.01) |
| G06Q 50/00 | (2012.01) |
| H04L 29/06 | (2006.01) |
| G06F 17/30 | (2006.01) |

(52) U.S. Cl.
CPC ........... *H04L 67/104* (2013.01); *G06Q 10/101* (2013.01); *G06Q 50/01* (2013.01); *H04L 65/403* (2013.01); *H04L 67/306* (2013.01); *G06F 17/30867* (2013.01)

(58) Field of Classification Search
CPC ............... H04L 12/185; H04L 67/1072; H04L 67/1061; H04L 67/1046; H04L 67/104; H04L 67/306; H04L 65/403; G06Q 10/101; G06Q 50/01; G06F 17/30867
USPC .................................. 709/204, 227; 715/751
See application file for complete search history.

(56) References Cited

U.S. PATENT DOCUMENTS

2009/0119265 A1*  5/2009  Chou et al. ........................ 707/3
2009/0157814 A1*  6/2009  Lee et al. ...................... 709/204

* cited by examiner

*Primary Examiner* — Jungwon Chang
(74) *Attorney, Agent, or Firm* — TransPacific Law Group; Pavel I. Pogodin, Esq.

(57) ABSTRACT

System enables users to surf the web and engage in social networking interaction through a downloadable peer-to-peer client that stores all user's private information locally on the user's computer. System establishes communication between the computers of multiple users participating in social interaction without having to store users' personal information on central servers. All user data, including, without limitation, pictures, ideas, personal information and communications with friends is maintained locally on the user's own computer and the social communication takes place between two or more users' computers. This provides the users with greater control over the dissemination of their personal information. In addition, the system randomly selects peer-to-peer social networking clients that are online at any given time and enable such clients to randomly and automatically connect with one another.

16 Claims, 4 Drawing Sheets

SYSTEM AND METHOD FOR PEER TO PEER SOCIAL NETWORKING

CROSS-REFERENCE TO RELATED PATENT APPLICATIONS

The present application relies on and claims benefit of priority under 35 U.S.C. 119 from U.S. provisional patent application Ser. No. 61/377,033, filed on Aug. 25, 2010, which is incorporated by reference herein in its entirety.

BACKGROUND OF THE INVENTION

Field of the Invention

This invention relates in general to Internet technology and, more particularly, to providing systems and methods for enabling peer-to-peer social networking between users.

Description of the Related Art

Social networking has become very popular among Internet users not only for staying in touch with friends, but also for meeting new people from different parts of the world. According to a conventional social networking technology, users create their personal profiles with a social networking service and make them available for online access by other users. This enables users to find other users with similar backgrounds, interests, political views, etc. and thereby establish social connections. It should be noted that in the above schema, all the user's profile information is stored on a central server or multiple servers operated by the provider of the social networking service.

The biggest drawback of the above-described conventional methodology is rooted in the fact that the existing social networking services store massive amounts of users' personal data on their central servers. This diminishes the user's ability to exercise control over dissemination of user' own personal information. This means, for example, that user's party pictures from his or her youth can circle back up and adversely impact their professional career or professional reputation many years in the future.

Therefore, there is a need for a system and method that would enable users to interact, meet new friends and stay in touch with existing friends on social networks, without storing all their personal data on social networking provider's centralized server system.

SUMMARY OF THE INVENTION

The inventive methodology is directed to methods and systems that substantially obviate one or more of the above and other problems associated with conventional techniques for enabling peer-to-peer social networking between users.

In accordance with one aspect of the present invention, there is provided a computer-implemented method performed in a system including multiple user client systems. The inventive method involves: executing an instance of a peer-to-peer social networking application on each of the user client systems; storing user profile information on each of the user client systems; obtaining, by at least one peer-to-peer social networking application address information; using the obtained address information to establish a connection between at least two user client systems; furnishing the stored user profile information to at least one other user client system using the established connection; and enabling electronic communication between users of at least two user client systems using the established connection.

In accordance with another aspect of the present invention, there is provided a computer-readable medium embodying a set of instructions, which, when executed by one or more processors of a system including multiple user client systems, cause the one or more processors to perform a method involving: executing an instance of a peer-to-peer social networking application on each of the user client systems; storing user profile information on each of the user client systems; obtaining, by at least one peer-to-peer social networking application address information; using the obtained address information to establish a connection between at least two user client systems; furnishing the stored user profile information to at least one other user client system using the established connection; and enabling electronic communication between users of at least two user client systems using the established connection.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
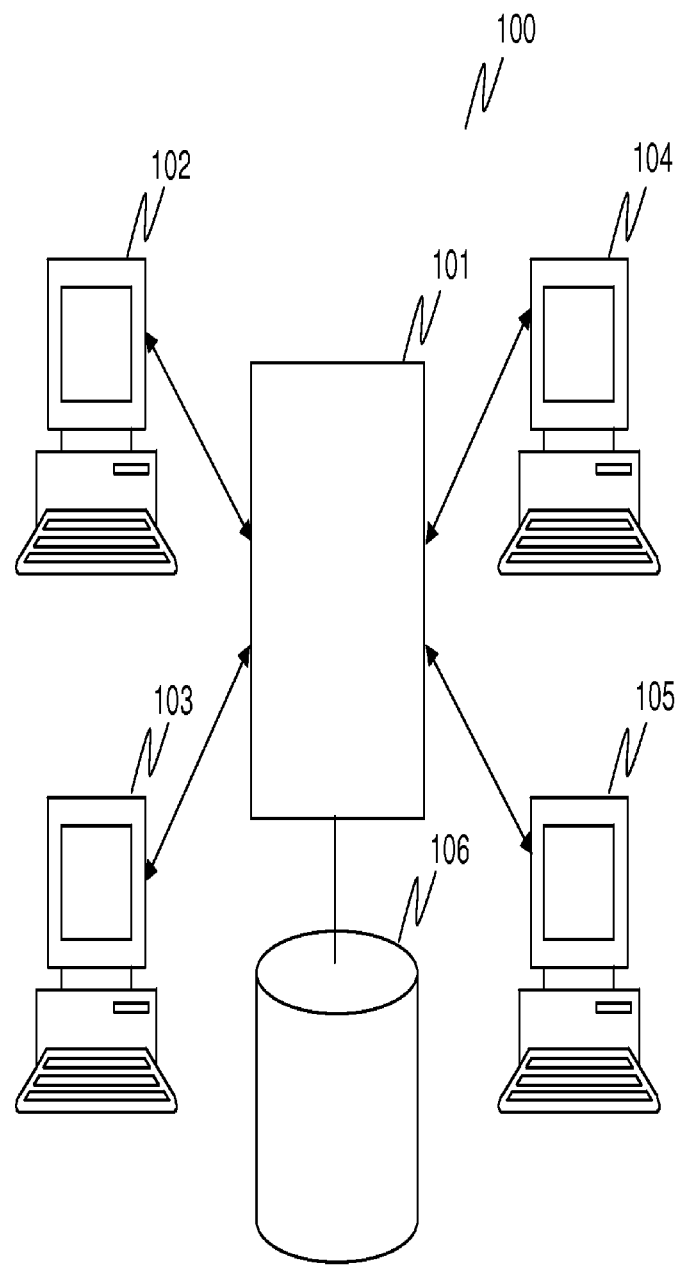
FIG. 1 illustrates an exemplary configuration of a convention system for providing online social networking service.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

As it is well-known to persons of skill in the art, peer-to-peer, commonly abbreviated to P2P, is a distributed network architecture composed of participants that make a portion of their resources (such as processing power, disk storage or network bandwidth) directly available to other network participants, without the need for central coordination instances (such as servers or stable hosts). Embodiments of the inventive methodology capitalize on peer-to-peer architecture to enable users to engage in online social interaction while exercising greater control over their personal information.

One or more embodiments of the inventive technology enables users to navigate the web and engage in social networking interaction through a downloadable peer-to-peer client that stores all user's private information locally on the user's computer. In one or more embodiments of the inventive technology, the inventive system establishes communication between the computers of multiple users participating in social interaction without having to store users' personal information on central servers.

In accordance with one or more embodiments of the invention, all user data, including, without limitation, pictures, ideas, personal information and communications with friends is maintained locally on the user's own computer and the social communication takes place between two or more users' computers. As would be appreciated by persons of skill in the art, this provides the users with greater control over the dissemination of their personal information.

As would be also appreciated by persons of skill in the art, there exists a need for users to meet new people online, including people from other parts of the world. Therefore, in accordance with one or more embodiments of the inventive methodology, the system randomly selects peer-to-peer social networking clients that are online at any given time and enable such clients to randomly and automatically connect with one another.

In one or more embodiments of the invention, the users can utilize the inventive peer-to-peer social networking technology for connecting with existing friends or for randomly meeting new people online. To this end, the embodiment of the inventive system sequentially provides the user with random selections of profiles of other persons. If the user does not like a specific random profile selection, the user is provided with a "next" button, which, upon activation by the user causes the current profile to be skipped and the next random profile to be provided to the user. If user likes the profile of the other person shown to the user, the user is provided with the opportunity to establish an online contact with that person.

Thus, the various embodiments of the inventive system enable the users to: a) stay connected with their friends and conduct social networking interaction with other users without utilizing central servers, while keeping all communication, content, and data on the client; and b) meet new people from around the world through random selection.

FIG. 1 illustrates an exemplary configuration of a convention system for providing online social networking service. In the conventional system 100 shown in FIG. 1, the online social networking system is implemented using a central server 101, which uses user profile information stored in the database or other storage facility 106. Users (not shown) access the online social networking service using client computers 102-105. The system enables users to view online profiles of other users and also enables the users to contact each other. It should be noted that in the system shown in FIG. 1, the central server 101 additionally performs the member directory functions.

Figure 2:
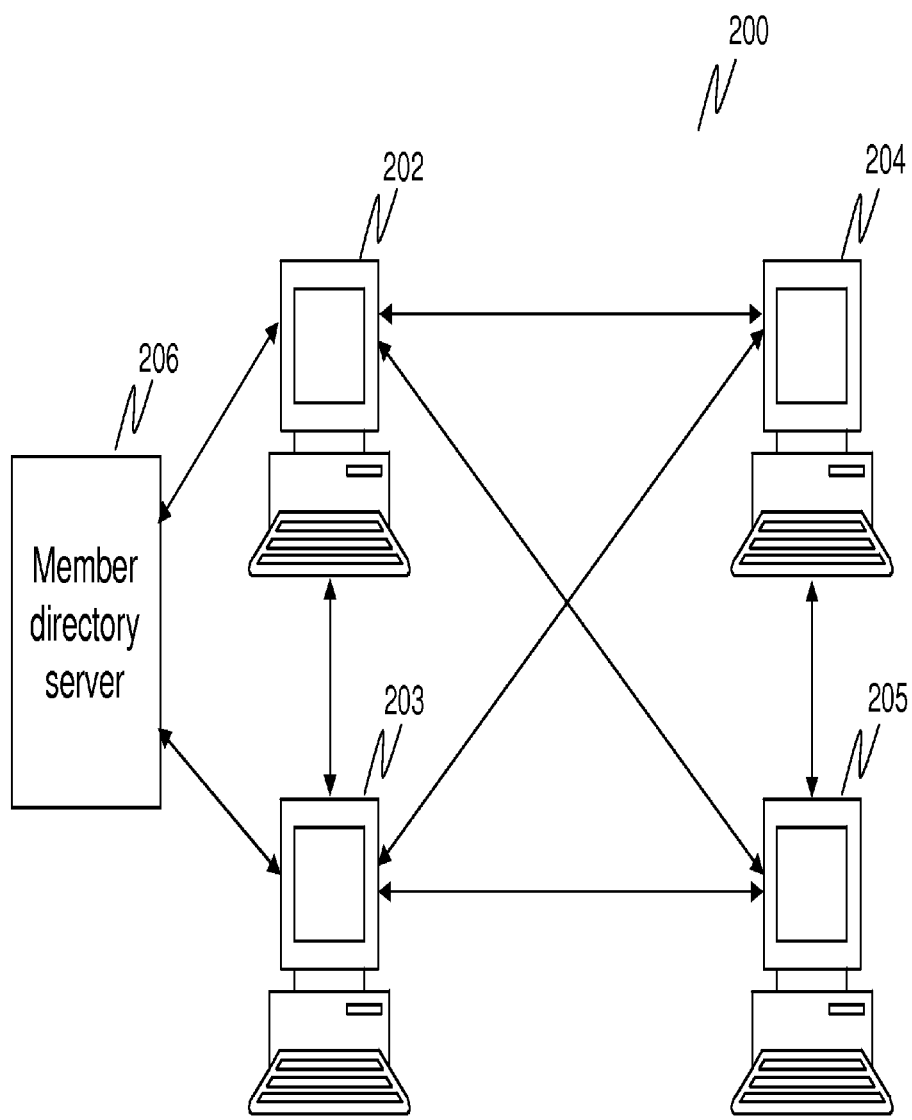
FIG. 2 illustrates an exemplary configuration of an embodiment of an inventive peer-to-peer system for providing online social networking service.

FIG. 2 illustrates an exemplary configuration of an embodiment of an inventive peer-to-peer system for providing online social networking service. As could be seen from FIG. 2, the inventive peer-to-peer system 200 is characterized by lack of the central server 101. Instead, clients 202-205 establish peer-to-peer connections with one another in order to access information of other users. In the system 200, the user profile information is stored locally on each of the client systems 202-205. As would be appreciated by persons of skill in the art, this (local) method of storing user information gives users greater control over their personal data. For example, the users are able to prevent third party applications from accessing their personal data, unlike centralized systems shown in FIG. 1, where the policies of the centralized systems control access to the user data.

To enable user to discover each other on the Internet and connect to one another, the inventive peer-to-peer social networking system is provided with a member directory 206, which may contain some basic information about the users, such as screen names and network addresses. The social networking application executing on the users' client computers is configured access this directory 206 in order to obtain network addresses of other users. In another embodiments, the member directory 206 maybe deployed on users' client computers. Once the user's client computer connects by means of a peer-to-peer connection to another user's client computer, the social networking application is configured to enable the connecting user to view the personal profile of the other user. In addition, the users are enabled to communicate with one another.

In one or more embodiments of the invention, the client computers 202-205 are mobile devices and the peer-to-peer is established based on the location of the users using these client devices 202-205. For example in one or more embodiments of the invention, the user computers are linked using Bluetooth connection, which would enable the users located, for example, in the same coffee shop or attending the same concert to exchange their social profiles and establish new social relationships. In another embodiment, the client devices 202-205 may include a location functionality. This location functionality may be based on the GPS service, on IP addresses of WIFI hotspots within range or any other presently known or later developed location technique. In this case, the social networking application executing on those devices is configured to connect only to proximate devices of other users, as determined using the information provided by the aforesaid location facility as well as location information associated with other users. Thus, in one implementation, the client devices 202-205 may exchange their location information and establish connections based on location-based policy.

In one or more embodiments of the invention, each user is provided with the ability to set the policy for establishing connections and for selection of other users who can access user's personal information. For example, the user may specify that only female users located within the same city block can access user's profile and communicate with the user. If the other user wants to contact the user, the user may be shown the contacting user's profile or a part thereof and asked to approve establishing the connection, before the connection is actually established.

Figure 3:
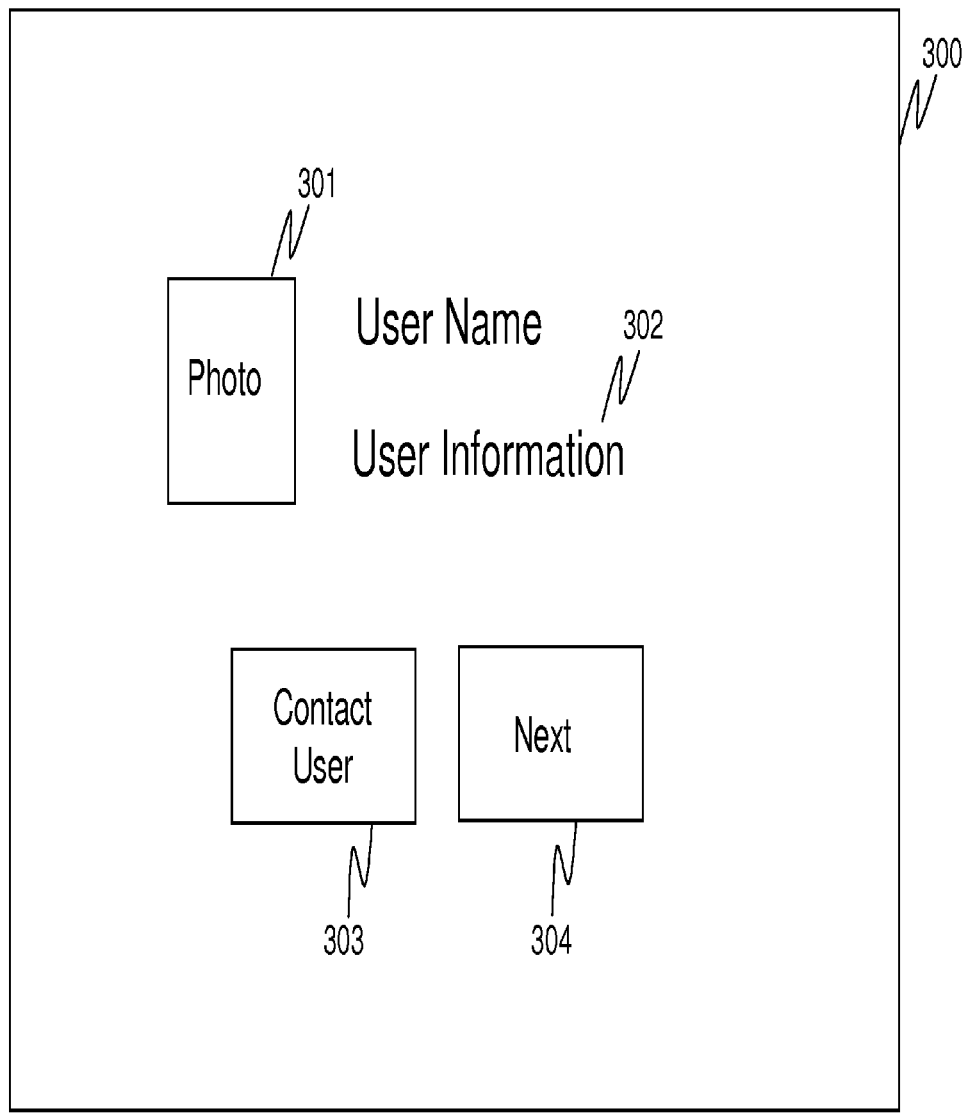
FIG. 3 illustrates an exemplary user interface of an embodiment of an inventive peer-to-peer system for providing online social networking service with random user matching.

FIG. 3 illustrates an exemplary user interface of an embodiment of an inventive peer-to-peer system for providing online social networking service with random user matching. In one or more embodiment of the invention, the inventive peer-to-peer system for providing online social networking service may be provided with a random user matching facility. In one or more embodiments, the inventive system would show a user profiles of other users which have been randomly selected based on a predetermined criteria specified by the user. For example, the user may be shown random profiles of users of opposite sex located in the same city. As shown in FIG. 3, an exemplary embodiment of the inventive system presents the user with a randomly selected profile of another user, which may include a photo of the other user 301, as well as user name and possibly other profile information 302. The user is also provided with two control buttons 303 and 304, which enable the user to either contact the other user (303) or move on to the next randomly selected user (304). As would be appreciated by those of skill in the art, such system facilitates establishing of new social connections between users.

Figure 4:
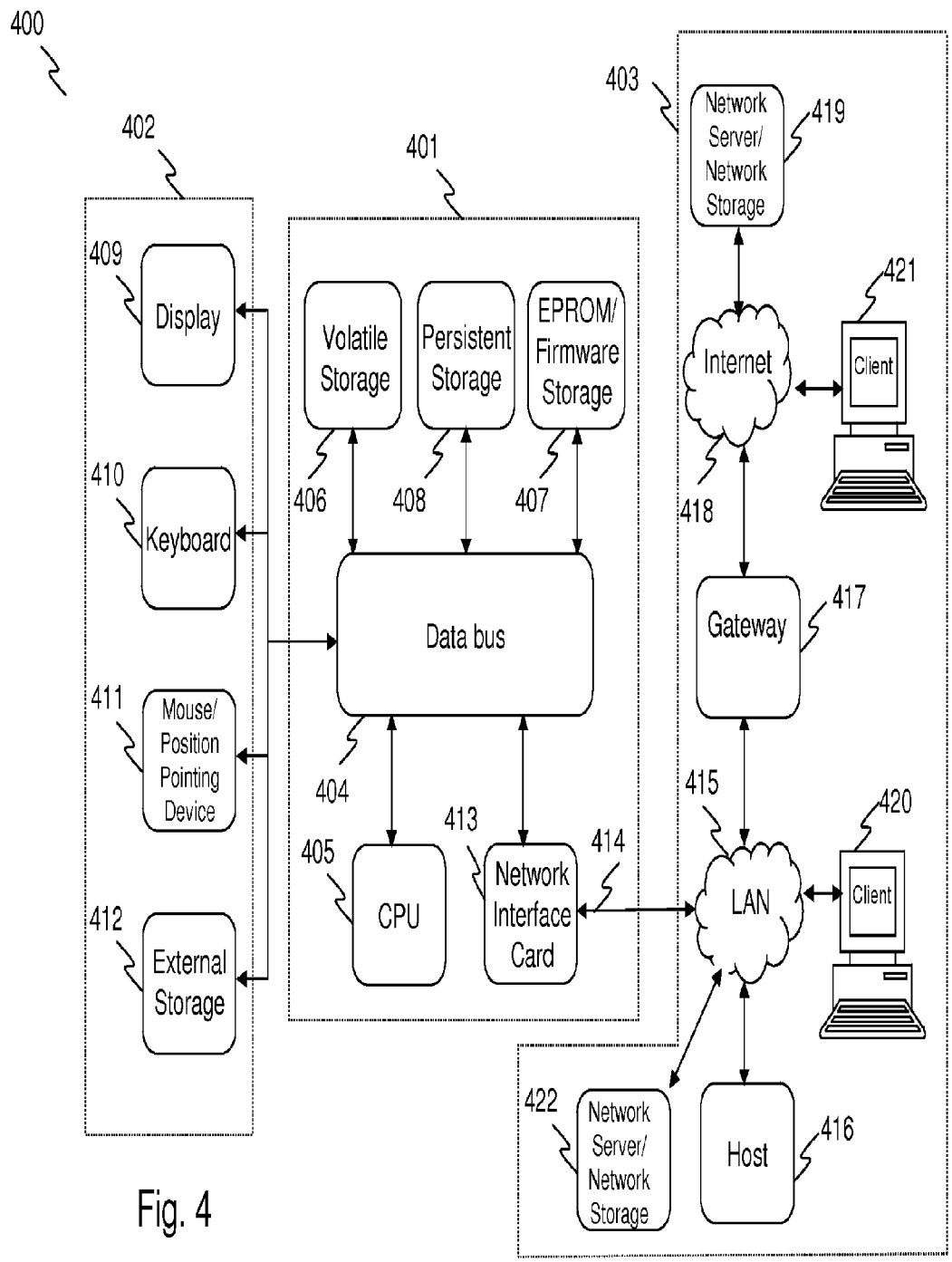
FIG. 4 illustrates an exemplary embodiment of a computer platform upon which the inventive system may be implemented.

FIG. 4 is a block diagram that illustrates an embodiment of a computer/server system 400 upon which an embodiment of the inventive methodology may be implemented. The system 400 includes a computer/server platform 401, peripheral devices 402 and network resources 403.

The computer platform 401 may include a data bus 405 or other communication mechanism for communicating information across and among various parts of the computer platform 401, and a processor 405 coupled with bus 401 for processing information and performing other computational and control tasks. Computer platform 401 also includes a volatile storage 406, such as a random access memory (RAM) or other dynamic storage device, coupled to bus 405 for storing various information as well as instructions to be executed by processor 405. The volatile storage 406 also may be used for storing temporary variables or other intermediate information during execution of instructions by processor 405. Computer platform 401 may further include a read only memory (ROM or EPROM) 407 or other static storage device coupled to bus 405 for storing static information and instructions for processor 405, such as basic input-output system (BIOS), as well as various system configuration parameters. A persistent storage device 408, such as a magnetic disk, optical disk, or solid-state flash memory device is provided and coupled to bus 401 for storing information and instructions.

Computer platform 401 may be coupled via bus 405 to a display 409, such as a cathode ray tube (CRT), plasma display, or a liquid crystal display (LCD), for displaying information to a system administrator or user of the computer platform 401. An input device 410, including alphanumeric and other keys, is coupled to bus 401 for communicating information and command selections to processor 405. Another type of user input device is cursor control device 411, such as a mouse, a trackball, or cursor direction keys for communicating direction information and command selections to processor 405 and for controlling cursor movement on display 409. This input device typically has two degrees of freedom in two axes, a first axis (e.g., x) and a second axis (e.g., y), that allows the device to specify positions in a plane.

An external storage device 412 may be coupled to the computer platform 401 via bus 405 to provide an extra or removable storage capacity for the computer platform 401. In an embodiment of the computer system 400, the external removable storage device 412 may be used to facilitate exchange of data with other computer systems.

The invention is related to the use of computer system 400 for implementing the techniques described herein. In an embodiment, the inventive system may reside on a machine such as computer platform 401. According to one embodiment of the invention, the techniques described herein are performed by computer system 400 in response to processor 405 executing one or more sequences of one or more instructions contained in the volatile memory 406. Such instructions may be read into volatile memory 406 from another computer-readable medium, such as persistent storage device 408. Execution of the sequences of instructions contained in the volatile memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 408. Volatile media includes dynamic memory, such as volatile storage 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 405 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 405. The bus 405 carries the data to the volatile storage 406, from which processor 405 retrieves and executes the instructions. The instructions received by the volatile memory 406 may optionally be stored on persistent storage device 408 either before or after execution by processor 405. The instructions may also be downloaded into the computer platform 401 via Internet using a variety of network data communication protocols well known in the art.

The computer platform 401 also includes a communication interface, such as network interface card 413 coupled to the data bus 405. Communication interface 413 provides a two-way data communication coupling to a network link 415 that is coupled to a local network 415. For example, communication interface 413 may be an integrated services digital network (ISDN) card or a modem to provide a data communication connection to a corresponding type of telephone line. As another example, communication interface 413 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 413 sends and receives electrical, electromagnetic or optical signals that carry digital data streams representing various types of information.

Network link 413 typically provides data communication through one or more networks to other network resources. For example, network link 415 may provide a connection through local network 415 to a host computer 416, or a network storage/server 417. Additionally or alternatively, the network link 413 may connect through gateway/firewall 417 to the wide-area or global network 418, such as an Internet. Thus, the computer platform 401 can access network resources located anywhere on the Internet 418, such as a remote network storage/server 419. On the other hand, the computer platform 401 may also be accessed by clients located anywhere on the local area network 415 and/or the Internet 418. The network clients 420 and 421 may themselves be implemented based on the computer platform similar to the platform 401.

Local network 415 and the Internet 418 both use electrical, electromagnetic or optical signals that carry digital data streams. The signals through the various networks and the signals on network link 415 and through communication interface 413, which carry the digital data to and from computer platform 401, are exemplary forms of carrier waves transporting the information.

Computer platform 401 can send messages and receive data, including program code, through the variety of network(s) including Internet 418 and LAN 415, network link 415 and communication interface 413. In the Internet example, when the system 401 acts as a network server, it might transmit a requested code or data for an application program running on client(s) 420 and/or 421 through Internet 418, gateway/firewall 417, local area network 415 and communication interface 413. Similarly, it may receive code from other network resources.

The received code may be executed by processor 405 as it is received, and/or stored in persistent or volatile storage devices 408 and 406, respectively, or other non-volatile storage for later execution.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the system for providing peer-to-peer social networking service.

It is intended that the specification and examples be considered as exemplary only, with a true scope and spirit of the invention being indicated by the following claims.

What is claimed is:

1. A computer-implemented method performed in a system comprising a plurality of user client systems, the method comprising:
   a. executing an instance of a peer-to-peer social networking application on each of the user client systems;
   b. storing user profile information on each of the user client systems;
   c. obtaining, by at least one peer-to-peer social networking application address information;
   d. using the obtained address information to establish a connection between at least two user client systems;
   e. furnishing the stored user profile information to at least one other user client system using the established connection;
   f. enabling electronic communication between users of at least two user client systems using the established connection; and
   g. upon receiving a skip user command from a user, randomly selecting another user client system, establishing a connection with the selected user client system and furnishing user profile information stored in the selected user client system to at least one other user client system using the established connection.

2. The computer-implemented method of claim 1, wherein the obtained address information comprises an address of a randomly selected user client system, and wherein the selection is based on a predetermined criteria.

3. The computer-implemented method of claim 1, wherein the obtained address information comprises an address of a selected user client system, and wherein the selection is based on a location of at least one user client system.

4. The computer-implemented method of claim 3, wherein the location is determined using a location service.

5. The computer-implemented method of claim 1, wherein the address information is obtained from a directory service accessing address information of the user client systems.

6. The computer-implemented method of claim 5, wherein the directory service is implemented on a network server accessible by the user client systems.

7. The computer-implemented method of claim 5, wherein the directory service is implemented on one or more of the user client systems.

8. The computer-implemented method of claim 1, wherein the user profile information is not stored outside of the associated user client system.

9. A non-transitory computer-readable medium embodying a set of instructions, which, when executed by one or more processors of a system comprising a plurality of user client systems, cause the one or more processors to perform a method comprising:
   a. executing an instance of a peer-to-peer social networking application on each of the user client systems;
   b. storing user profile information on each of the user client systems;
   c. obtaining, by at least one peer-to-peer social networking application address information;
   d. using the obtained address information to establish a connection between at least two user client systems;
   e. furnishing the stored user profile information to at least one other user client system using the established connection;

f. enabling electronic communication between users of at least two user client systems using the established connection; and g. upon receiving a skip user command from a user, randomly selecting another user client system, establishing a connection with the selected user client system and furnishing user profile information stored in the selected user client system to at least one other user client system using the established connection.

10. The computer-readable medium of claim 9, wherein the obtained address information comprises an address of a randomly selected user client system, and wherein the selection is based on a predetermined criteria.

11. The computer-readable medium of claim 9, wherein the obtained address information comprises an address of a selected user client system, and wherein the selection is based on a location of at least one user client system.

12. The computer-readable medium of claim 11, wherein the location is determined using a location service.

13. The computer-readable medium of claim 9, wherein the address information is obtained from a directory service accessing address information of the user client systems.

14. The computer-readable medium of claim 13, wherein the directory service is implemented on a network server accessible by the user client systems.

15. The computer-readable medium of claim 13, wherein the directory service is implemented on one or more of the user client systems.

16. The computer-readable medium of claim 9, wherein the user profile information is not stored outside of the associated user client system.

* * * * *